US 10,793,744 B2

(12) United States Patent
Steinmetz et al.

(10) Patent No.: US 10,793,744 B2
(45) Date of Patent: Oct. 6, 2020

(54) CARBOXY-FUNCTIONAL POLYETHER-BASED REACTION PRODUCTS AND AQUEOUS BASE COATS CONTAINING THE REACTION PRODUCTS

(71) Applicant: BASF Coatings GmbH, Münster (DE)

(72) Inventors: Bernhard Steinmetz, Ruetschenhausen (DE); Peter Hoffmann, Senden (DE); Hardy Reuter, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 253 days.

(21) Appl. No.: 15/781,227

(22) PCT Filed: Nov. 30, 2016

(86) PCT No.: PCT/EP2016/079182
§ 371 (c)(1),
(2) Date: Jun. 4, 2018

(87) PCT Pub. No.: WO2017/097638
PCT Pub. Date: Jun. 15, 2017

(65) Prior Publication Data
US 2018/0362798 A1    Dec. 20, 2018

(30) Foreign Application Priority Data
Dec. 9, 2015  (EP) .................................... 15198643

(51) Int. Cl.
| C09D 7/41 | (2018.01) |
| C09D 167/02 | (2006.01) |
| C09D 167/00 | (2006.01) |
| C08G 63/668 | (2006.01) |
| B05D 7/02 | (2006.01) |
| B05D 7/14 | (2006.01) |
| B05D 7/00 | (2006.01) |
| C09D 5/44 | (2006.01) |
| C08G 65/332 | (2006.01) |
| C08L 51/08 | (2006.01) |
| C08L 61/28 | (2006.01) |

(52) U.S. Cl.
CPC ........... *C09D 167/025* (2013.01); *B05D 7/02* (2013.01); *B05D 7/14* (2013.01); *B05D 7/532* (2013.01); *C08G 63/668* (2013.01); *C09D 5/4473* (2013.01); *C09D 7/41* (2018.01); *C09D 167/00* (2013.01); *C08G 65/3326* (2013.01); *C08L 51/08* (2013.01); *C08L 61/28* (2013.01)

(58) Field of Classification Search
USPC ....................................................... 428/480
See application file for complete search history.

(56) References Cited

U.S. PATENT DOCUMENTS

| 3,542,917 A | 11/1970 | Schwartz et al. |
| 8,399,554 B2 | 3/2013 | Roller et al. |
| 2016/0236234 A1 | 8/2016 | Steinmetz et al. |
| 2016/0319151 A1 | 11/2016 | Steinmetz et al. |
| 2016/0319155 A1 | 11/2016 | Steinmetz et al. |
| 2016/0326665 A1 | 11/2016 | Steinmetz et al. |
| 2016/0347957 A1 | 12/2016 | Steinmetz et al. |
| 2017/0137662 A1 | 5/2017 | Steinmetz et al. |
| 2017/0137666 A1 | 5/2017 | Steinmetz et al. |
| 2017/0145252 A1 | 5/2017 | Steinmetz et al. |
| 2017/0158906 A1 | 6/2017 | Steinmetz et al. |
| 2017/0158907 A1 | 6/2017 | Steinmetz |
| 2018/0208782 A1 | 7/2018 | Steinmetz et al. |

FOREIGN PATENT DOCUMENTS

| DE | 4009858 A1 | 10/1991 |
| DE | 4437535 A1 | 4/1996 |
| DE | 19914896 A1 | 10/2000 |
| DE | 19930665 A1 | 1/2001 |
| DE | 19948004 A1 | 7/2001 |
| DE | 10043405 C1 | 6/2002 |
| DE | 102012016444 A1 | 2/2014 |
| EP | 0228003 A1 | 7/1987 |
| EP | 0521928 B1 | 8/1994 |
| EP | 0634431 A1 | 1/1995 |
| EP | 1454971 B1 | 2/2006 |
| GB | 934782 A | 8/1963 |

(Continued)

OTHER PUBLICATIONS

International Search Report for International Application No. PCT/EP2016/079182, dated Jan. 31, 2017, 2 pages.

(Continued)

Primary Examiner — Terressa Boykin
(74) Attorney, Agent, or Firm — Armstrong Teasdale LLP

(57) ABSTRACT

A pigmented aqueous basecoat material is disclosed. The pigmented aqueous basecoat material includes a polyether-based reaction product which is preparable by a reaction of trimesic acid with at least one polyether of the general structural formula (I)

$$H \left[ O - R \right]_n O - H \qquad (I)$$

R is a $C_3$ to $C_6$ alkylene radical and n is selected accordingly such that the at least one polyether possesses a number-average molecular weight of 500 to 5000 g/mol. The trimesic acid and the at least one polyether are used in the reaction in a molar ratio of 0.7/2.3 to 1.6/1.7 and the resulting reaction product possesses an acid number of 10 to 50 mg KOH/g.

14 Claims, No Drawings

(56) References Cited

FOREIGN PATENT DOCUMENTS

| JP | 2011184642 A | 9/2011 |
|---|---|---|
| WO | 1991015528 A1 | 10/1991 |
| WO | 1992015405 A1 | 9/1992 |
| WO | 2015028197 A1 | 3/2015 |
| WO | WO-2017097642 A1 | 6/2017 |

OTHER PUBLICATIONS

European Search Report for EP Patent Application No. 15198643.7, dated May 30, 2016, 3 pages.

1

CARBOXY-FUNCTIONAL POLYETHER-BASED REACTION PRODUCTS AND AQUEOUS BASE COATS CONTAINING THE REACTION PRODUCTS

CROSS-REFERENCE TO RELATED APPLICATIONS

This application is a U.S. National Phase Application of PCT/EP2016/079182, filed Nov. 30, 2016, which claims the benefit of priority to EP Application No. 15198643.7, filed Dec. 9, 2015, the contents of which are hereby expressly incorporated by reference in their entirety.

BRIEF DESCRIPTION

The present invention relates to innovative carboxy-functional, polyether-based reaction products. It further relates to aqueous basecoat materials which comprise the reaction products and also to the use of said reaction products in aqueous basecoat materials. It additionally relates to a method for producing multicoat paint systems using aqueous basecoat materials, and also to the multicoat paint systems producible by means of said method.

BACKGROUND

There are a multiplicity of known methods for producing multicoat color and/or effect paint systems (also called multicoat finishes). The prior art (compare, for example, German patent application DE 199 48 004 A1, page 17, line 37, to page 19, line 22, or German patent DE 100 43 405 C1, column 3, paragraph [0018], and column 8, paragraph [0052], column 9, paragraph [0057], in conjunction with column 6, paragraph [0039], to column 8, paragraph [0050]), for example, discloses the following method, which involves
(1) applying a pigmented aqueous basecoat material to a substrate,
(2) forming a polymer film from the coating material applied in stage (1),
(3) applying a clearcoat material to the resultant basecoat, and subsequently
(4) curing the basecoat together with the clearcoat.

This method is widely used, for example, for the original finish (OEM) of automobiles and also for the painting of metal and plastic parts for installation in or on vehicles. The present-day requirements for the technological qualities of such paint systems (coatings) in application are massive.

A constantly recurring problem and one still not resolved to entire satisfaction by the prior art is the mechanical resistance of the multicoat systems produced, particularly with respect to stonechip effects.

The qualities of the basecoat material, which is particularly important in this context, and of the coats produced from it are determined in particular by the binders and additives—for example, specific reaction products—present in the basecoat material.

A further factor is that nowadays the replacement of coating compositions based on organic solvents by aqueous coating compositions is becoming ever more important, in order to meet the rising requirements for environmental compatibility.

EP 1 454 971 B1 discloses polyester polyols which are obtainable by reaction of at least one polycarboxylic acid and at least one OH compound. At least 45 mol % of the polycarboxylic acid used here consists of trimellitic anhydride. The OH compound has an average molecular weight of at least 210 g/mol. The polyester polyol finds application for improving the technological and particularly the esthetic qualities of multicoat paint systems, and is used in basecoat materials.

The problem addressed by the present invention was therefore that of providing a reaction product which can be used to produce coatings that no longer have the disadvantages referred to above in the prior art. More particularly, the provision of a new reaction product and the use thereof in aqueous basecoat materials ought to create the opportunity for provision of coatings which exhibit very good stonechip resistance and which at the same time can be produced in an eco-friendly way through the use precisely of aqueous basecoat materials.

DETAILED DESCRIPTION

The problems stated have been solved by a pigmented aqueous basecoat material which comprises a carboxy-functional, polyether-based reaction product which is preparable by reaction of
(a) trimesic acid
with
(b) at least one polyether of the general structural formula (I)

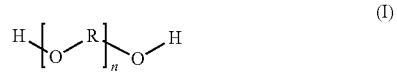

in which
R is a $C_3$ to $C_6$ alkylene radical and n is selected accordingly such that the polyether (b) possesses a number-average molecular weight of 500 to 5000 g/mol,
the components (a) and (b) being used in the reaction in a molar ratio of 0.7/2.3 to 1.6/1.7 and the resulting reaction product possessing an acid number of 5 to 50 mg KOH/g.

The condition that n is selected such that said polyether possesses a number-average molecular weight of 500 to 5000 g/mol may be illustrated as follows: Where, for example, R is a tetramethylene radical and the number-average molecular weight is to be 1000 g/mol, n is on average between 13 and 14. From the mandates given, the skilled person is well aware of how to produce or select a corresponding reaction product. Apart from this, the description below, and particularly the examples, further provide additional information. The parameter n is therefore to be understood as a statistical average value, just like the number-average molecular weight.

The new basecoat material is also referred to below as basecoat material of the invention. Preferred embodiments of the basecoat material of the invention are apparent from the following description and also from the dependent claims.

Likewise provided for the present invention is the reaction product per se and also the use of the reaction product in aqueous basecoat materials for improving the stonechip resistance. The present invention relates not least to a method for producing a multicoat paint system on a substrate and also to a multicoat system produced by the stated method.

Through the use of the reaction products of the invention, basecoat materials are obtained whose use in the context of production of coatings, especially multicoat paint systems, leads to very good stonechip resistance. The reaction product of the invention and also the basecoat material of the invention can be used in the area of original finishing, particularly in the automobile industry sector, and in the area of automotive refinish.

Component (a)

The reaction product of the invention is preparable using trimesic acid. As is known, trimesic acid is an aromatic carboxylic acid in which the three carboxylic acid groups are arranged directly on the aromatic ring in the 1,3,5-position.

Component (b)

The reaction products of the invention may be prepared using at least one polyether of the general structural formula (I)

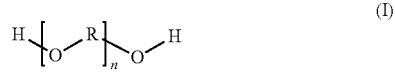
(I)

where R is a $C_3$ to $C_6$ alkyl radical. The index n should be selected in each case such that said polyether possesses a number-average molecular weight of 500 to 5000 g/mol. With preference it possesses a number-average molecular weight of 750 to 4000 g/mol, more preferably of 1000 to 3500 g/mol, and very preferably 1500 to 3200 g/mol. The number-average molecular weight may for example be 1000 g/mol, 2000 g/mol, or 3000 g/mol.

For the purposes of the present invention, unless specifically indicated otherwise, the number-average molecular weight is determined by means of vapor pressure osmosis. Measurement for the purposes of the present invention was carried out by means of a vapor pressure osmometer (model 10.00 from Knauer) on concentration series of the component under analysis in toluene at 50° C. with benzophenone as calibration substance to determine the experimental calibration constant of the instrument used (according to E. Schröder, G. Müller, K.-F. Arndt, "Leitfaden der Polymercharakterisierung" [Principles of polymer characterization], Akademie-Verlag, Berlin, pp. 47-54, 1982, where the calibration substance used was benzil).

As is known, and as has already been elucidated earlier on above, the number-average molecular weight is always a statistical average value. The same must therefore also be true of the parameter n in formula (I). The designation "polyether" selected for component (b), and requiring elucidation in this context, is understood as follows: for polymers, polyethers (b) for example, the compounds are always mixtures of molecules with different sizes. At least some or all of these molecules are distinguished by a sequence of identical or different monomer units (as the reacted form of monomers). The polymer or the molecule mixture therefore in principle comprises molecules which comprise a plurality of (in other words, at least two) identical or different monomer units. A proportion of the mixture may of course comprise the monomers themselves, in other words in their unreacted form. This is a result, as is known, simply of the preparation reaction—i.e., polymerization of monomers—which in general does not proceed with molecular uniformity. While a particular monomer can be ascribed a discrete molecular weight, then, a polymer is always a mixture of molecules differing in their molecular weight. Consequently it is not possible to describe a polymer by a discrete molecular weight; instead, as is known, it is always assigned average molecular weights, an example being the number-average molecular weight stated above.

In the polyether for use in accordance with the invention, all n radicals R may be the same. It is also possible, though, for different kinds of radicals R to be present. Preferably all the radicals R are the same.

R is preferably a $C_4$ alkylene radical. More preferably it is a tetramethylene radical.

With very particular preference the polyether for use in accordance with the invention is a linear polytetrahydrofuran which on average is diolic.

The Reaction Product

There are no peculiarities to the preparation of the reaction product. The components (a) and (b) are linked with one another via common-knowledge condensation reactions of hydroxyl groups with carboxylic acids. The reaction may take place, for example, in bulk or in solution with typical organic solvents at temperatures of 100° C. to 300° C., for example. Use may of course also be made of typical catalysts such as sulfuric acid, sulfonic acids and/or tetraalkyl titanates, zinc and/or tin alkoxylates, dialkyltin oxides such as di-n-butyltin oxide, for example, or organic salts of the dialkyltin oxides. In the case of condensation reactions, moreover, it is customary to use a water separator to collect the water arising. It should of course be noted that a carboxy-functional reaction product is to form. Since component (b) is employed in excess, care must be taken to ensure that the particular desired amount of carboxyl groups remains in the resulting product. This can readily be achieved by the skilled person by monitoring the acid number in the course of the reaction, by means of corresponding measurements, and terminating the reaction after the desired acid number has been reached, such termination being accomplished, for example, by cooling to a temperature at which reaction can no longer take place.

The components (a) and (b) here are used in a molar ratio of 0.7/2.3 to 1.6/1.7, preferably of 0.8/2.2 to 1.6/1.8, and very preferably of 0.9/2.1 to 1.5/1.8. A further particularly preferred ratio range is from 0.45/1 to 0.55/1.

The reaction product is carboxy-functional. The acid number of the reaction product is from 5 to 50 mg KOH/g, preferably 6 to 40 mg KOH/g, especially preferably 7 to 35 mg KOH/g, and very preferably 10 to 30 mg KOH/g. The acid number is determined in accordance with DIN 53402 and relates, of course, in each case to the product per se (and not to the acid number of any solution or dispersion of the product in a solvent that is present). Where reference is made to an official standard in the context of the present invention, the reference is of course to the version of the standard applicable on filing or, if there is no applicable version at that point in time, to the last applicable version.

The resulting reaction product possesses preferably a number-average molecular weight of 1500 to 15 000 g/mol, preferably of 2000 to 10 000 g/mol, and very preferably of 2200 to 8000 g/mol.

The reaction product of the invention is generally hydroxy-functional, preferably on average dihydroxy-functional. Hence with preference it possesses not only hydroxyl functions but also carboxyl functions.

For especially preferred reaction products it is the case that they are preparable by reaction of (a) trimesic acid with (b) a diolic, linear polytetrahydrofuran having a number-average molecular weight of 1500 to 3200 g/mol, the components (a) and (b) are used in a molar ratio of 0.45/1 to 0.55/1, and the reaction products have an acid number of 8 to 40 mg KOH/g and a number-average molecular weight of 2000 to 10 000 g/mol.

The Pigmented Aqueous Basecoat Material

The present invention relates further to a pigmented aqueous basecoat material which comprises at least one reaction product of the invention. All of the above-stated preferred embodiments in relation to the reaction product also apply, of course, to the basecoat material comprising the reaction product.

A basecoat material is understood to be a color-imparting intermediate coating material that is used in automotive finishing and general industrial painting. This basecoat material is generally applied to a metallic or plastics substrate which has been pretreated with a baked (fully cured) surfacer or primer-surfacer, or else, occasionally, is applied directly to the plastics substrate. Substrates used may also include existing paint systems, which may optionally require pretreatment as well (by abrading, for example). It has now become entirely customary to apply more than one basecoat film. Accordingly, in such a case, a first basecoat film constitutes the substrate for a second such film. A particular possibility in this context, instead of application to a coat of a baked surfacer, is to apply the first basecoat material directly to a metal substrate provided with a cured electrocoat, and to apply the second basecoat material directly to the first basecoat film, without separately curing the latter. To protect a basecoat film, or the uppermost basecoat film, from environmental effects in particular, at least an additional clearcoat film is applied over it. This is generally done in a wet-on-wet process—that is, the clearcoat material is applied without the basecoat film(s) being cured. Curing then takes place, finally, jointly. It is now also widespread practice to produce only one basecoat film on a cured electrocoat film, then to apply a clearcoat material, and then to cure these two films jointly. The latter is a preferred embodiment in the context of the present invention. The reason is that when using the reaction product of the invention, in spite of the production of only one basecoat and therefore of a consequent significant simplification in operation, the result is excellent stonechip resistance.

The sum total of the weight-percentage fractions, based on the total weight of the pigmented aqueous basecoat material, of all reaction products of the invention is preferably 0.1 to 20 wt %, more preferably 0.5 to 15 wt %, and very preferably 1.0 to 10 wt % or even 1.5 to 5 wt %.

Where the amount of the reaction product of the invention is below 0.1 wt %, it may be possible that no further improvement in adhesion and stonechip resistance is achieved. Where the amount is more than 20 wt %, there may in certain circumstances be disadvantages, on account of the then numerous potentially anionic groups (carboxylate groups) in the reaction product, in terms of the condensation resistance of the paint system produced from the basecoat material.

In the case of a possible particularization to basecoat materials comprising preferred reaction products in a specific proportional range, the following applies. The reaction products which do not fall within the preferred group may of course still be present in the basecoat material. In that case the specific proportional range applies only to the preferred group of reaction products. It is preferred nonetheless for the total proportion of reaction products, consisting of reaction products of the preferred group and reaction products which are not part of the preferred group, to be subject likewise to the specific proportional range.

In the case of restriction to a proportional range of 0.5 to 15 wt % and to a preferred group of reaction products, therefore, this proportional range evidently applies initially only to the preferred group of reaction products. In that case, however, it would be preferable for there to be likewise from 0.5 to 15 wt % in total present of all originally encompassed reaction products, consisting of reaction products from the preferred group and reaction products which do not form part of the preferred group. If, therefore, 5 wt % of reaction products of the preferred group are used, not more than 10 wt % of the reaction products of the nonpreferred group may be used.

The stated principle is valid, for the purposes of the present invention, for all stated components of the basecoat material and for their proportional ranges—for example, for the pigments, for the polyurethane resins as binders, or else for the crosslinking agents such as melamine resins.

The basecoat materials used in accordance with the invention comprise color and/or effect pigments. Such color pigments and effect pigments are known to those skilled in the art and are described, for example, in Römpp-Lexikon Lacke and Druckfarben, Georg Thieme Verlag, Stuttgart, New York, 1998, pages 176 and 451.

The fraction of the pigments may be situated for example in the range from 1 to 40 wt %, preferably 2 to 35 wt %, more preferably 3 to 30 wt %, based on the total weight of the pigmented aqueous basecoat material.

Preferred basecoat materials in the context of the present invention are those which comprise, as binders, polymers curable physically, thermally, or both thermally and with actinic radiation. A "binder" in the context of the present invention and in accordance with relevant DIN EN ISO 4618 is the nonvolatile component of a coating composition, without pigments and fillers. Specific binders, accordingly, include, for example, typical coatings additives, the reaction product of the invention, or typical crosslinking agents described later on below, even if the expression is used primarily below in relation to particular polymers curable physically, thermally, or both thermally and with actinic radiation, as for example particular polyurethane resins.

Besides the reaction product of the invention, the pigmented aqueous basecoat materials of the invention more preferably comprise at least one further polymer, different from the reaction product, as binder, more particularly at least one polymer selected from the group consisting of polyurethanes, polyesters, poly(meth)acrylates and/or copolymers of the stated polymers, especially preferably at any rate, though not necessarily exclusively, at least one polyurethane-poly(meth)acrylate.

In the context of the present invention, the term "physical curing" means the formation of a film through loss of solvent from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7 line 28 to page 9 line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators. Where thermal curing and curing with actinic light are employed in unison, the term "dual cure" is also used.

In the present invention preference is given both to basecoat materials which are curable physically and to those which are curable thermally. In the case of basecoat materials which are curable thermally, there is of course always also a proportion of physical curing. For reasons not least of ease of comprehension, however, these coating materials are referred to as thermally curable.

Preferred thermally curing basecoat materials are those which comprise as binder a polyurethane resin and/or polyurethane-poly(meth)acrylate, preferably a hydroxyl-containing polyurethane resin and/or polyurethane-poly(meth)acrylate, and as crosslinking agent an aminoplast resin or a blocked or nonblocked polyisocyanate, preferably an aminoplast resin. Among the aminoplast resins, melamine resins are preferred.

The sum total of the weight-percentage fractions, based on the total weight of the pigmented aqueous basecoat material, of all crosslinking agents, preferably aminoplast resins and/or blocked and/or nonblocked polyisocyanates, more particularly preferably melamine resins, is preferably 1 to 20 wt %, more preferably 1.5 to 17.5 wt %, and very preferably 2 to 15 wt % or even 2.5 to 10 wt %.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin may be present alongside the polymer originating from the polymerization of the olefinically unsaturated monomers, without these polymers being bonded covalently to one another. Equally, however, the polyurethane resin may also be bonded covalently to the polymer originating from the polymerization of the olefinically unsaturated monomers. Both groups of the aforementioned resins, then, are copolymers, which in the case of the use of (meth)acrylate-group-containing monomers as olefinically unsaturated monomers, can also be called polyurethane-poly(meth)acrylates (see also earlier on above). This kind of polyurethane-poly(meth)acrylates, more particularly hydroxy-functional polyurethane-poly(meth)acrylates, are particularly preferred for use in the context of the present invention. The olefinically unsaturated monomers are thus preferably monomers containing acrylate groups and/or methacrylate groups. It is likewise preferred for the monomers containing acrylate and/or methacrylate groups to be used in combination with other olefinically unsaturated compounds which contain no acrylate or methacrylate groups. Olefinically unsaturated monomers bonded covalently to the polyurethane resin are more preferably monomers containing acrylate groups or methacrylate groups. This form of polyurethane-poly(meth)acrylates is further preferred.

Suitable saturated or unsaturated polyurethane resins and/or polyurethane-poly(meth)acrylates are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32, or German patent application DE 44 37 535 A1.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols are more particularly polyester polyols, especially those having a number-average molecular weight of 400 to 5000 g/mol.

For hydrophilic stabilization and/or for increasing the dispersibility in aqueous medium, the polyurethane resin preferably present may contain particular ionic groups and/or groups which can be converted into ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification)

or functional groups which can be converted to anions by neutralizing agents, and/or anionic groups (anionic modification)

and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly (oxyalkylene) alcohols known to those skilled in the art.

As already indicated above, the polyurethane resin may preferably be a graft polymer by means of olefinically unsaturated monomers. In this case, then, the polyurethane is grafted, for example, with side groups and/or side chains that are based on olefinically unsaturated monomers. These are more particularly side chains based on poly(meth)acrylates, with the systems in question then being the polyurethane-poly(meth)acrylates already described above. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to be side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion (see also description earlier on above). In this case the polyurethane resin present in the primary dispersion may contain lateral and/or terminal olefinically unsaturated groups via which, then, the graft polymerization with the olefinically unsaturated compounds proceeds. The polyurethane resin for grafting may therefore be an unsaturated polyurethane resin. The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane resin. This attachment takes place instead of or in addition to the radical reaction of the olefinically unsaturated compounds with the lateral and/or terminal olefinically unsaturated groups optionally present in the polyurethane resin. This is then followed again by the graft polymerization via radical polymerization, as described earlier on above. The result in any case is polyurethane resins grafted with olefinically unsaturated compounds, preferably olefinically unsaturated monomers.

As olefinically unsaturated compounds with which the polyurethane resin is preferably grafted it is possible to use virtually all radically polymerizable, olefinically unsaturated, and organic monomers which are available to the skilled person for these purposes. A number of preferred monomer classes may be specified by way of example:

hydroxyalkyl esters of (meth)acrylic acid or of other alpha,beta-ethylenically unsaturated carboxylic acids,
(meth)acrylic acid alkyl and/or cycloalkyl esters having up to 20 carbon atoms in the alkyl radical,
ethylenically unsaturated monomers comprising at least one acid group, more particularly exactly one carboxyl group, such as (meth)acrylic acid, for example,
vinyl esters of monocarboxylic acids which are branched in alpha-position and have 5 to 18 carbon atoms,
reaction products of (meth)acrylic acid with the glycidyl ester of a monocarboxylic acid which is branched in alpha-position and has 5 to 18 carbon atoms,
further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth) acrylate groups, and so the side chains attached by grafting are poly(meth)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polymerization of polyisocyanates and polyols to polyurethanes, and the graft polymerization that preferably then follows with olefinically unsaturated compounds. These methods are known to the skilled person and can be adapted individually. Exemplary preparation processes and reaction conditions can be found in European patent EP 0521 928 B1, page 2, line 57 to page 8, line 16.

The polyurethane resin preferably present possesses, for example, a hydroxyl number of 0 to 250 mg KOH/g, but more particularly from 20 to 150 mg KOH/g. The acid number of the polyurethane resin is preferably 5 to 200 mg KOH/g, more particularly 10 to 40 mg KOH/g. The hydroxyl number is determined in the context of the present invention in accordance with DIN 53240.

The polyurethane resin content is preferably between 5 and 80 wt %, more preferably between 8 and 70 wt %, and more preferably between 10 and 60 wt %, based in each case on the film-forming solids of the basecoat material.

Irrespective of occasional reference in the context of the present invention both to polyurethanes (also called polyurethane resins) and to polyurethane-poly(meth)acrylates, the expression "polyurethanes", as a generic term, embraces the polyurethane-poly(meth)acrylates. If, therefore, no distinction is made between the two classes of polymer in a particular passage, but instead only the expression "polyurethane" or "polyurethane resin" is stated, both polymer classes are encompassed.

By film-forming solids, corresponding ultimately to the binder fraction, is meant the nonvolatile weight fraction of the basecoat material, without pigments and, where appropriate, fillers. The film-forming solids can be determined as follows: A sample of the pigmented aqueous basecoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried at 120° C. for two hours and the resulting film-forming solids are obtained by weighing.

The sum total of the weight-percentage fractions, based on the total weight of the pigmented aqueous basecoat material, of all polyurethane resins is preferably 2 to 40 wt %, more preferably 2.5 to 30 wt %, and very preferably 3 to 25 wt %.

There is preferably also a thickener present. Suitable thickeners are inorganic thickeners from the group of the phyllosilicates. As well as the inorganic thickeners, however, it is also possible to use one or more organic thickeners. These are preferably selected from the group consisting of (meth)acrylic acid-(meth)acrylate copolymer thickeners, as for example the commercial product Rheovis AS S130 (BASF), and of polyurethane thickeners, as for example the commercial product Rheovis PU 1250 (BASF). The thickeners used are different from the binders used.

Furthermore, the pigmented aqueous basecoat material may further comprise at least one adjuvant. Examples of such adjuvants are salts which can be decomposed thermally without residue or substantially without residue, resins as binders that are curable physically, thermally and/or with actinic radiation and are different from the above-described polymers, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Also included may be thickeners such as organic thickeners from the group of the phyllosilicates or organic thickeners such as (meth)acrylic acid-(meth)acrylate copolymer thickeners, or else polyurethane thickeners, which are different from the binders used.

Suitable adjuvants of the aforementioned kind are known, for example, from
    German patent application DE 199 48 004 A1, page 14, line 4, to page 17, line 5,
    German patent DE 100 43 405 C1 column 5, paragraphs [0031] to [0033].
They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 8 to 60 wt %, and very preferably 12 to 55 wt %.

By solids content (nonvolatile fraction) is meant that weight fraction which remains as a residue on evaporation under specified conditions. In the present application, the solids content, unless explicitly indicated otherwise, is determined in accordance with DIN EN ISO 3251. This is done by evaporating the basecoat material at 130° C. for 60 minutes.

Unless indicated otherwise, this test method is likewise employed in order to determine, for example, the fraction of various components of the basecoat material as a proportion of the total weight of the basecoat material. Thus, for example, the solids content of a dispersion of a polyurethane resin which is to be added to the basecoat material may be determined correspondingly in order to ascertain the fraction of this polyurethane resin as a proportion of the overall composition.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

The Method of the Invention and the Multicoat Paint System of the Invention

A further aspect of the present invention is a method for producing a multicoat paint system, by
    (1) applying a pigmented aqueous basecoat material to a substrate,
    (2) forming a polymer film from the coating material applied in stage (1),
    (3) applying a clearcoat material to the resultant basecoat, and then
    (4) curing the basecoat together with the clearcoat, which comprises using in stage (1) a pigmented aqueous basecoat material which comprises at least one reaction product of the invention. All of the above observations relating to the reaction product of the invention and to the pigmented aqueous basecoat material are also valid in respect of the method of the invention. This is true more particularly also of all preferred, very preferred, and especially preferred features.

Said method is preferably used to produce multicoat color paint systems, effect paint systems, and color and effect paint systems.

The pigmented aqueous basecoat material used in accordance with the invention is commonly applied to metallic or plastics substrates that have been pretreated with surfacer or primer-surfacer. Said basecoat material may optionally also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to metallic substrates already coated, as described above, with cured electrocoat systems and/or surfacers may take place in the film thicknesses customary within the automobile industry, in the range, for example, of 5 to 100 micrometers, preferably 5 to 60 micrometers (dry film thickness). This is done using spray application methods, as for example compressed air spraying, airless spraying, high-speed rotation, electrostatic spray application (ESTA), alone or in conjunction with hot spray application, such as for example, hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers (dry film thickness).

After the clearcoat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing takes place preferably thermally at temperatures from 60 to 200° C. Thermally curing basecoat materials are preferably those which comprise as additional binder a polyurethane resin and as crosslinking agent an aminoplast resin or a blocked or nonblocked polyisocyanate, preferably an aminoplast resin. Among the aminoplast resins, melamine resins are preferred.

In one particular embodiment, the method for producing a multicoat paint system comprises the following steps:

producing a cured electrocoat film on the metallic substrate by electrophoretic application of an electrocoat material to the substrate and subsequent curing of the electrocoat material, producing (i) a basecoat film or (ii) a plurality of basecoat films directly following one another directly on the cured electrocoat film by (i) application of an aqueous basecoat material directly to the electrocoat film, or (ii) directly successive application of two or more basecoat materials to the electrocoat film, producing a clearcoat film directly on (i) the basecoat film or (ii) the uppermost basecoat film, by application of a clearcoat material directly to (i) one basecoat film or (ii) the uppermost basecoat film, where (i) one basecoat material or (ii) at least one of the basecoat materials is a basecoat material of the invention, joint curing of the basecoat film (i) or of the basecoat films (ii) and also of the clearcoat film.

In the latter embodiment, then, in comparison to the above-described standard methods, there is no application and separate curing of a commonplace surfacer. Instead, all of the films applied to the electrocoat film are cured jointly, thereby making the overall operation much more economical. Nevertheless, in this way, and particularly through the use of a basecoat material of the invention comprising a reaction product of the invention, multicoat paint systems are constructed which have outstanding mechanical stability and adhesion and hence are particularly technologically outstanding.

The application of a coating material directly to a substrate or directly to a previously produced coating film is understood as follows: The respective coating material is applied in such a way that the coating film produced from it is disposed on the substrate (on the other coating film) and is in direct contact with the substrate (with the other coating film). Between coating film and substrate (other coating film), therefore, there is more particularly no other coat. Without the detail "direct", the applied coating film, while disposed on the substrate (the other film), need not necessarily be present in direct contact. More particularly, further coats may be disposed between them. In the context of the present invention, therefore, the following is the case: In the absence of particularization as to "direct", there is evidently no restriction to "direct".

Plastics substrates are coated basically in the same way as metallic substrates. Here, however, in general, curing takes place at significantly lower temperatures, of 30 to 90° C. Preference is therefore given to the use of two-component clearcoat materials.

The method of the invention can be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All of the above observations relating to the reaction product of the invention and to the pigmented aqueous basecoat material are also valid in respect of said multicoat paint system and of the method of the invention. This is also true especially of all the preferred, more preferred and most preferred features.

The multicoat paint systems of the invention are preferably multicoat color paint systems, effect paint systems, and color and effect paint systems.

A further aspect of the invention relates to the method of the invention, wherein said substrate from stage (1) is a multicoat paint system having defects. This substrate/multicoat paint system, which possesses defects, is therefore an original finish, which is to be repaired or completely recoated.

The method of the invention is suitable accordingly for repairing defects on multicoat paint systems. Film defects are generally faults on and in the coating, usually named according to their shape or their appearance. The skilled person is aware of a host of possible kinds of such film defects. They are described for example in Römpp-Lexikon Lacke and Druckfarben, Georg Thieme Verlag, Stuttgart, New York, 1998, page 235, "Film defects".

The multicoat paint systems produced by means of the method of the invention may likewise have such defects. In one preferred embodiment of the method of the invention, therefore, the substrate from stage (1) is a multicoat paint system of the invention which exhibits defects.

These multicoat paint systems are produced preferably on automobile bodies or parts thereof, by means of the method of the invention, identified above, in the context of automotive OEM finishing. Where such defects occur directly after OEM finishing has taken place, they are repaired immediately. The term "OEM automotive refinishing" is therefore also used. Where only small defects require repair, only the "spot" is repaired, and the entire body is not completely recoated (dual coating). The former process is called "spot repair". The use of the method of the invention for remedying defects on multicoat paint systems (original finishes) of the invention in OEM automotive refinishing, therefore, is particularly preferred.

Where reference is made, in the context of the present invention, to the automotive refinish segment, in other words when the repair of defects is the topic, and the substrate specified is a multicoat paint system possessing defects, this of course means that this substrate/multicoat paint system with defects (original finish) is generally located on a plastic substrate or on a metallic substrate as described above.

So that the repaired site has no color difference from the rest of the original finish, it is preferred for the aqueous basecoat material used in stage (1) of the method of the invention for repairing defects to be the same as that which was used to produce the substrate/multicoat paint system with defects (original finish).

The observations above concerning the reaction product of the invention and the aqueous pigmented basecoat material therefore are also valid for the use, under discussion, of the method of the invention for repairing defects on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defects on the multicoat paint system of the invention can be repaired by means of the above-described method of the invention. For this purpose, the surface to be repaired on the multicoat paint system may initially be abraded. The abrading is preferably performed by partially sanding, or sanding off, only the basecoat and the clearcoat, optionally only the clearcoat, from the original finish, but not sanding off the primer layer and surfacer layer that are generally situated beneath them. In this way, during the refinish, there is no need in particular for renewed application of specialty primers and primer-surfacers. This form of abrading has become established especially in the OEM automotive refinishing segment, since here, in contrast to refinishing in a workshop, generally speaking, defects occur only in the basecoat and/or clearcoat region, but do not, in particular, occur in the region of the underlying surfacer and primer coats. Defects in the latter coats are more likely to be encountered in the workshop refinish sector. Examples include paint damage such as scratches, which are produced, for example, by mechanical effects and which often extend down to the substrate surface (metallic or plastic substrate).

After the abrading procedure, the pigmented aqueous basecoat material is applied to the defect site in the original finish by spray application: for example, by pneumatic atomization. After the pigmented aqueous basecoat material has been applied, it can be dried by known methods. For example, the basecoat material may be dried at room temperature for 1 to 60 minutes and subsequently dried at optionally slightly elevated temperatures of 30 to 80° C. Flashing and drying for the purposes of the present invention means evaporation of organic solvents and/or water, whereby the coating material is as yet not fully cured. For the purposes of the present invention it is preferred for the basecoat material to comprise a polyurethane resin as binder and an aminoplast resin, preferably a melamine resin, as crosslinking agent.

A commercial clearcoat material is subsequently applied, by techniques that are likewise commonplace. Following application of the clearcoat material, it may be flashed off at room temperature for 1 to 60 minutes, for example, and optionally dried. The clearcoat material is then cured together with the applied pigmented basecoat material.

In the case of so-called low-temperature baking, curing takes place preferably at temperatures of 20 to 90° C. Preference here is given to using two-component clearcoat materials. If, as described above, a polyurethane resin is used as further binder and an aminoplast resin is used as crosslinking agent, there is only slight crosslinking by the aminoplast resin in the basecoat film at these temperatures. Here, in addition to its function as a curing agent, the aminoplast resin also serves for plasticizing and may assist pigment wetting. Besides the aminoplast resins, nonblocked isocyanates may also be used. Depending on the nature of the isocyanate used, they crosslink at temperatures from as low as 20° C. Waterborne basecoat materials of this kind are then of course generally formulated as two-component systems.

In the case of what is called high-temperature baking, curing is accomplished preferably at temperatures of 130 to 150° C. Here both one-component and two-component clearcoat materials are used. If, as described above, a polyurethane resin is used as further binder and an aminoplast resin is used as crosslinking agent, there is crosslinking by the aminoplast resin in the basecoat film at these temperatures.

A further aspect of the present invention is the use of the reaction product of the invention in pigmented aqueous basecoat materials for improving the adhesion and the stonechip resistance of paint systems produced using the basecoat material.

The invention is illustrated below using examples.

Examples

Determination of the Number-Average Molecular Weight:

The number-average molecular weight was determined by means of vapor pressure osmosis. Measurement took place using a vapor pressure osmometer (model 10.00 from Knauer) on concentration series of the test component in toluene at 50° C. with benzophenone as calibration compound for the determination of the experimental calibration constant of the instrument used (according to E. Schröder, G. Müller, K.-F. Arndt, "Leitfaden der Polymercharakterisierung" [Principles of polymer characterization], Academy-Verlag, Berlin, pp. 47-54, 1982, where the calibration compound used was in fact benzil).

Production of Inventive Reaction Products (IR) and also of Reaction Products used for Comparison (CR):

IR1:

In a 4 l stainless steel reactor equipped with anchor stirrer, thermometer, condenser, thermometer for overhead temperature measurement, and water separator, 105 g of trimesic acid and 2000 g of PolyTHF2000 (from BASF SE) with an OH number of 56 mg KOH/g (1.0 mol) were heated over the course of 3 hours to a product temperature of 220° C. (OH number determination according to DIN 53240). The progress of the reaction was monitored via the determination of the acid number. When an acid number of about 13.5 mg KOH/g was reached, the batch was cooled to below 140° C. and diluted with butyl glycol to a solids content of 90%. A slightly yellowish resin which is viscous at room temperature and has an acid number of 13.1 mg KOH/g (based on solids content) is obtained.

Number-average molecular weight (vapor pressure osmosis): 3900 g/mol

Viscosity 65% in butyl glycol: 3500 mPas (measured at 23° C. using a Brookfield CAP 2000+ rotary viscometer, spindle 3, shear rate: 5000 $s^{-1}$).

IR2:

In a 4 l stainless steel reactor equipped with anchor stirrer, thermometer, condenser, thermometer for overhead temperature measurement, and water separator, 42.03 g of trimesic acid and 1160 g of PolyTHF2900 (INVISTA, Wichita, Kans., USA) with an OH number of 38.7 mg KOH/g (0.4 mol) were heated over the course of 3 hours to a product temperature of 220° C. (OH number determination according to DIN 53240). The progress of the reaction was monitored via the determination of the acid number. When an acid number of about 12.1 mg KOH/g was reached, the batch was cooled to below 140° C. and diluted with butyl glycol to a solids content of 90%. A slightly yellowish resin which is viscous at room temperature and has an acid number of 10.9 mg KOH/g (based on solids content) is obtained.

Number-average molecular weight (vapor pressure osmosis): 4300 g/mol

Viscosity 65% in butyl glycol: 3770 mPas (measured at 23° C. using a Brookfield CAP 2000+ rotary viscometer, spindle 3, shear rate: 5000 $s^{-1}$).

CR1:

A polyester prepared as per example D, column 16, lines 37 to 59 of DE 4009858 A served as reaction product used for comparison, butyl glycol being used as organic solvent instead of butanol, that is to say butyl glycol and water are present as solvents. The corresponding dispersion of the polyester has a solids content of 60 wt %.

Preparation of Aqueous Basecoat Materials

The following should be taken into account regarding formulation constituents and amounts thereof as indicated in the tables hereinafter. When reference is made to a commercial product or to a preparation protocol described elsewhere, the reference, independently of the principal designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, as for example "polymer", "polyester" or "polyurethane-modified polyacrylate". This must be taken into account if conclusions are to be drawn concerning the amount of the active substance (of the polymer).

All proportions indicated in the tables are parts by weight.

Preparation of a Non-Inventive Waterborne Basecoat Material 1

The components listed under "Aqueous phase" in table A were stirred together in the order stated to form an aqueous mixture. In the next step, an organic mixture was prepared from the components listed under "Organic phase". The organic mixture was added to the aqueous mixture. The combined mixtures were then stirred for 10 minutes and adjusted using deionized water and dimethylethanolamine to a pH of 8 and to a spray viscosity of 58 mPas under a shearing load of 1000 $s^{-1}$, measured using a rotational viscometer (Rheomat RM 180 instrument from Mettler-Toledo) at 23° C.

TABLE A

Waterborne basecoat material 1

| Component | Parts by weight |
|---|---|
| Aqueous phase | |
| Aqueous solution of 3% sodium lithium magnesium phyllosilicate Laponite ® RD (from Altana-Byk) and 3% Pluriol ® P900 (from BASF SE) | 27 |
| Deionized water | 15.9 |
| Butyl glycol (from BASF SE) | 3.5 |
| Hydroxy-functional, polyurethane-modified polyacrylate; prepared as per page 7, line 55 to page 8, line 23 of DE 4437535 A1 | 2.4 |
| 50 wt % strength solution of Rheovis ® PU 1250 (BASF SE) in butyl glycol, rheological agent | 0.2 |
| CR1 | 2.5 |
| TMDD 50% BG (from BASF SE), 52% strength solution of 2,4,7,9-tetramethyl-5-decyne-4,7-diol in butyl glycol | 1.2 |
| Luwipal ® 052 (from BASF SE), melamine-formaldehyde resin | 4.7 |
| 10% strength solution of N,N-dimethylethanolamine (from BASF SE) in water | 0.5 |
| Polyurethane-based graft copolymer; prepared in analogy to DE 19948004 A1 (page 27 - example 2) | 19.6 |
| Isopropanol (from BASF SE) | 1.4 |
| Byk-347 ® (from Altana-Byk) | 0.5 |
| Pluriol ® P900 (from BASF SE) | 0.3 |
| Tinuvin ® 384-2 (from BASF SE) | 0.6 |
| Tinuvin ® 123 (from BASF SE) | 0.3 |

TABLE A-continued

Waterborne basecoat material 1

| Component | Parts by weight |
|---|---|
| Carbon black paste | 4.3 |
| Blue paste | 11.4 |
| Mica slurry | 2.8 |
| Organic phase | |
| Aluminum pigment (from Altana-Eckart) | 0.3 |
| Butyl glycol (from BASF SE) | 0.3 |
| Polyurethane-based graft copolymer; prepared in analogy to DE 19948004 A1 (page 27 - example 2) | 0.3 |

Preparation of Blue Paste:

The blue paste was prepared from 69.8 parts by weight of an acrylated polyurethane dispersion prepared as per international patent application WO 91/15528, binder dispersion A, 12.5 parts by weight of Paliogen® Blue L 6482, 1.5 parts by weight of dimethylethanolamine (10% strength in DI water), 1.2 parts by weight of a commercial polyether (Pluriol® P900 from BASF SE), and 15 parts by weight of deionized water.

Preparation of Carbon Black Paste:

The carbon black paste was prepared from 25 parts by weight of an acrylated polyurethane dispersion prepared as per international patent application WO 91/15528, binder dispersion A, 10 parts by weight of carbon black, 0.1 part by weight of methyl isobutyl ketone, 1.36 parts by weight of dimethylethanolamine (10% strength in DI water), 2 parts by weight of a commercial polyether (Pluriol® P900 from BASF SE), and 61.45 parts by weight of deionized water.

Preparation of the Mica Slurry:

The mica slurry was obtained by using a stirring element to mix 1.5 parts by weight of polyurethane-based graft copolymer, prepared in an analogy to DE 19948004 A1 (page 27—example 2), and 1.3 parts by weight of the commercial Mica Mearlin Ext. Fine Violet 539V from Merck.

Preparation of the Inventive Waterborne Basecoat Materials I1 and I2

The waterborne basecoat materials I1 and I2 were prepared in analogy to table A, but using the reaction product IR1 (waterborne basecoat material I1) or the reaction product IR2 (waterborne basecoat material I2) in place of CR1. The proportion used of the reaction product IR1 or IR2 was the same in each case, through compensation of the amount of solvent and/or through consideration of the solids content of the component to be added.

TABLE B

Basecoat materials 1, I1 and I2

| | Reaction product |
|---|---|
| Waterborne basecoat material 1 | CR1 |
| Waterborne basecoat material I1 | IR1 |
| Waterborne basecoat material I2 | IR2 |

Comparison Between Waterborne Basecoat Materials 1 and I1, I2

Stonechip Resistance:

For the determination of the stonechip resistance, the multicoat paint systems were produced according to the following general protocol:

The substrate used was a steel panel with dimensions of 10×20 cm, coated with a cathodic e-coat (cathodic electrocoat).

Applied to this panel first of all was the respective basecoat material (table B), applied pneumatically in a target film thickness (dry film thickness) at 20 micrometers. After the basecoat had been flashed at room temperature for 1 minute, it was subjected to interim drying in a forced air oven at 70° C. for 10 minutes. Over the interim-dried waterborne basecoat, a customary two-component clearcoat material was applied in a target film thickness (dry film thickness) at 40 micrometers. The resulting clearcoat was flashed at room temperature for 20 minutes. The waterborne basecoat and the clearcoat were subsequently cured in a forced air oven at 160° C. for 30 minutes.

The resulting multicoat paint systems were tested for their stonechip resistance. This was done using the stonechip test of DIN 55966-1. The results of the stonechip test were assessed in accordance with DIN EN ISO 20567-1. Lower values represent better stonechip resistance.

The results are found in table 1. The waterborne basecoat material (WBM) detail indicates which WBM was used in the particular multicoat paint system.

TABLE 1

Stonechip resistance of waterborne basecoat materials 1 and I1, I2

| WBM | Stonechip outcome |
|---|---|
| 1 | 2.5 |
| I1 | 1.5 |
| I2 | 1.5 |

The results emphasize that the use of the inventive reaction products in basecoat materials significantly increases the stonechip resistance by comparison with the waterborne basecoat material 1.

Preparation of a Noninventive Waterborne Basecoat Material 2

The components listed under "Aqueous phase" in table C were stirred together in the order stated to form an aqueous mixture. The combined mixtures were then stirred for 10 minutes and adjusted using deionized water and dimethylethanolamine to a pH of 8 and to a spray viscosity of 58 mPas under a shearing load of $1000\ s^{-1}$, measured using a rotational viscometer (Rheomat RM 180 instrument from Mettler-Toledo) at 23° C.

TABLE C

Waterborne basecoat material 2

| Component | Parts by weight |
|---|---|
| Aqueous phase | |
| Aqueous solution of 3% sodium lithium magnesium phyllosilicate Laponite ® RD (from Altana-Byk) and 3% Pluriol ® P900 (from BASF SE) | 14 |
| Deionized water | 16 |
| Butyl glycol (from BASF SE) | 1.4 |
| CR1 | 2.3 |
| 10 wt % strength solution of Rheovis ® AS 1130 (BASF SE) in butyl glycol, rheological agent | 6 |

TABLE C-continued

Waterborne basecoat material 2

| Component | Parts by weight |
|---|---|
| TMDD 50% BG (from BASF SE), 52% strength solution of 2,4,7,9-tetramethyl-5-decyne-4,7-diol in butyl glycol | 1.6 |
| Cymel ® 1133 (from Cytec), melamine-formaldehyde resin | 5.9 |
| 10% strength solution of N,N-dimethylethanolamine (from BASF SE) in water | 0.4 |
| Polyurethane dispersion - prepared as per WO 92/15405 (page 14, line 13 to page 15, line 28) | 20 |
| 2-Ethylhexanol (from BASF SE) | 3.5 |
| Triisobutyl phosphate (from Bayer) | 2.5 |
| Nacure ® 2500 (from King Industries) | 0.6 |
| White paste | 24 |
| Carbon black paste | 1.8 |

Preparation of the Carbon Black Paste:

The carbon black paste was prepared from 25 parts by weight of an acrylated polyurethane dispersion prepared as per international patent application WO 91/15528, binder dispersion A, 10 parts by weight of carbon black, 0.1 part by weight of methyl isobutyl ketone, 1.36 parts by weight of dimethylethanolamine (10% strength in DI water), 2 parts by weight of a commercial polyether (Pluriol® P900 from BASF SE), and 61.45 parts by weight of deionized water.

Preparation of the White Paste:

The white paste was prepared from 43 parts by weight of an acrylated polyurethane dispersion prepared as per international patent application WO 91/15528, binder dispersion A, 50 parts by weight of titanium rutile 2310, 3 parts by weight of 1-propoxy-2-propanol, and 4 parts by weight of deionized water.

Preparation of the Inventive Waterborne Basecoat Materials I3 and I4

The waterborne basecoat materials I3 and I4 were prepared in analogy to table C, but using the reaction product IR1 (waterborne basecoat material I3) and, respectively, the reaction product IR2 (waterborne basecoat material I4) in place of CR1. The same proportion of the reaction product IR1 and IR2, respectively, was used in each case, through compensation of the amount of solvent and/or through consideration of the solids content of the component to be added.

TABLE D

Basecoat materials 2, I3 and I4

| | Reaction product |
|---|---|
| Waterborne basecoat material 2 | CR1 |
| Waterborne basecoat material I3 | IR1 |
| Waterborne basecoat material I4 | IR2 |

Preparation of a Noninventive Waterborne Basecoat Material 3

The components listed under "Aqueous phase" in table E were stirred together in the order stated to form an aqueous mixture. In the next step, an organic mixture was prepared from the components listed under "Organic phase". The organic mixture was added to the aqueous mixture. The combined mixtures were then stirred for 10 minutes and adjusted using deionized water and dimethylethanolamine to a pH of 8 and to a spray viscosity of 58 mPas under a shearing load of 1000 $s^{-1}$, measured using a rotational viscometer (Rheomat RM 180 instrument from Mettler-Toledo) at 23° C.

TABLE E

Waterborne basecoat material 3

| Component | Parts by weight |
|---|---|
| Aqueous phase | |
| Aqueous solution of 3% sodium lithium magnesium phyllosilicate Laponite ® RD (from Altana-Byk) and 3% Pluriol ® P900 (from BASF SE) | 20.35 |
| Deionized water | 17.27 |
| Butyl glycol (from BASF SE) | 2.439 |
| Hydroxy-functional, polyurethane-modified polyacrylate; prepared as per page 7, line 55 to page 8, line 23 of DE 4437535 A1 | 2.829 |
| 50 wt % strength solution of Rheovis ® PU 1250 (BASF SE) in butyl glycol, rheological agent | 0.234 |
| 10 wt % strength solution of Rheovis ® AS 1130 (BASF SE) in butyl glycol, rheological agent | 4.976 |
| TMDD 50% BG (from BASF SE), 52% strength solution of 2,4,7,9-tetramethyl-5-decyne-4,7-diol in butyl glycol | 1.317 |
| Cymel ® 1133 (from Cytec), melamine-formaldehyde resin | 3.512 |
| 10% strength solution of N,N-dimethylethanolamine (from BASF SE) in water | 1.356 |
| Polyurethane dispersion - prepared as per WO 92/15405 (page 14, line 13 to page 15, line 28) | 24.976 |
| Isopropanol (from BASF SE) | 1.659 |
| Byk-347 ® (from Altana-Byk) | 0.537 |
| Pluriol ® P900 (from BASF SE) | 0.39 |
| 2-Ethylhexanol (from BASF SE) | 1.854 |
| Triisobutyl phosphate (from Bayer) | 1.151 |
| Nacure ® 2500 (from King Industries) | 0.39 |
| Tinuvin ® 384-2 (from BASF SE) | 0.605 |
| Tinuvin ® 123 (from BASF SE) | 0.39 |
| Blue paste | 0.605 |
| Organic phase | |
| Aluminum pigment 1 (from Altana-Eckart) | 4.585 |
| Aluminum pigment 2 (from Altana-Eckart) | 0.907 |
| Butyl glycol (from BASF SE) | 3.834 |
| Polyurethane-based graft copolymer; prepared in analogy to DE 19948004 A1 (page 27 - example 2) | 3.834 |

Preparation of the Blue Paste:

The blue paste was prepared from 69.8 parts by weight of an acrylated polyurethane dispersion prepared as per international patent application WO 91/15528, binder dispersion A, 12.5 parts by weight of Paliogen® Blue L 6482, 1.5 parts by weight of dimethylethanolamine (10% strength in DI water), 1.2 parts by weight of a commercial polyether (Pluriol® P900 from BASF SE), and 15 parts by weight of deionized water.

Comparison Between Waterborne Basecoat Materials 2 and I3, I4

For the determination of the stonechip resistance, the multicoat paint systems were produced according to the following general protocol:

The substrate used was a steel panel with dimensions of 10×20 cm, coated with a cathodic e-coat.

The respective basecoat material (table D) was first of all applied to this panel in a target film thickness (dry film thickness) at 20 micrometers. After flashing of the basecoat material at room temperature for 4 minutes, the waterborne basecoat material 3 was applied in a target film thickness (dry film thickness) at 20 micrometers, then flashed at room temperature for 4 minutes and then subjected to interim drying in a forced air oven at 70° C. for 10 minutes. Over the interim-dried waterborne basecoat, a customary two-component clearcoat material was applied in a target film thickness (dry film thickness) at 40 micrometers. The resulting clearcoat was flashed at room temperature for 20 minutes. The waterborne basecoat and the clearcoat were subsequently cured in a forced air oven at 160° C. for 30 minutes.

The results are found in table 2. The specification of the waterborne basecoat material (WBM) indicates in each case which WBM was used in the respective multicoat paint system.

TABLE 2

| Stonechip resistance of the waterborne basecoat materials 2 and I3, I4 | |
|---|---|
| WBM | Stonechip result |
| 2 + 3 | 2.5 |
| I3 + 3 | 1.5 |
| I4 + 3 | 1.5 |

The results again emphasize that the use of the inventive reaction products in basecoat materials significantly increases the stonechip resistance in comparison to noninventive systems.

What is claimed is:

1. A pigmented aqueous basecoat material comprising a polyether-based reaction product which is prepared by a reaction of
   (a) trimesic acid
   with
   (b) at least one polyether of a general structural formula (I)

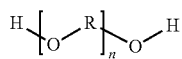

in which
   R is a $C_3$ to $C_6$ alkylene radical and n is selected accordingly such that the polyether (b) possesses a number-average molecular weight of 750 to 5000 g/mol,
   the components (a) and (b) being used in the reaction in a molar ratio of 0.7/2.3 to 1.6/1.7 and the resulting reaction product possessing an acid number of 5 to 50 mg KOH/g.

2. The pigmented aqueous basecoat material as claimed in claim 1, wherein the polyether (b) possesses a number-average molecular weight of 1500 to 3200 g/mol.

3. The pigmented aqueous basecoat material as claimed in claim 1, wherein the group R in the general structural formula (I) comprises tetramethylene radicals.

4. The pigmented aqueous basecoat material as claimed in claim 1, wherein the components (a) and (b) are used in a molar ratio of 0.45/1 to 0.55/1.

5. The pigmented aqueous basecoat material as claimed in claim 1, wherein the polyether-based reaction product possesses a number-average molecular weight of 1500 to 15 000 g/mol.

6. The pigmented aqueous basecoat material as claimed in claim 1, which has an acid number of 10 to 30 mg KOH/g.

7. The pigmented aqueous basecoat material as claimed in claim 1, wherein a sum total of the weight-percentage fractions, based on a total weight of the pigmented aqueous basecoat material, of all polyether-based reaction products is 0.1 to 20 wt %.

8. The pigmented aqueous basecoat material as claimed in claim 1, further comprising a melamine resin and a polyurethane resin that is grafted by means of olefinically unsaturated monomers and that further comprises hydroxyl groups.

9. A polyether-based reaction product which is prepared by a reaction of
   (a) trimesic acid
   with
   (b) at least one polyether of a general structural formula (I)

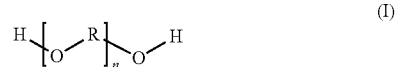

in which
   R is a $C_3$ to $C_6$ alkylene radical and n is selected accordingly such that the polyether (b) possesses a number-average molecular weight of 750 to 5000 g/mol,
   the components (a) and (b) being used in the reaction in a molar ratio of 0.7/2.3 to 1.6/1.7 and the resulting reaction product possessing an acid number of 5 to 50 mg KOH/g.

10. A method for improving a stonechip resistance of paint systems produced using a pigmented aqueous basecoat material comprising utilizing a reaction product as claimed in claim 9 in the pigmented aqueous basecoat material.

11. A method for producing a multicoat paint system comprising the steps of
    (1) applying a pigmented aqueous basecoat material to a substrate,
    (2) forming a polymer basecoat film from the pigmented aqueous basecoat material applied in step (1),
    (3) applying a clearcoat material to the resultant polymer basecoat film, and subsequently
    (4) curing the polymer basecoat film together with the clearcoat,
    wherein the pigmented aqueous basecoat material as claimed in claim 1 is used in step (1).

12. The method as claimed in claim 11, wherein the substrate from step (1) is a metallic substrate coated with a cured electrocoat, and all coats applied to the electrocoat are cured jointly.

13. The method as claimed in claim 11, wherein the substrate from step (1) is a metal or plastics substrate.

14. A multicoat paint system producible by the method as claimed in claim 11.

* * * * *